United States Patent
Qiu

(10) Patent No.: US 11,346,708 B2
(45) Date of Patent: May 31, 2022

(54) BARK DETECTION METHOD, BARK DETECTION DEVICE AND BARK STOP DEVICE WITH DEVICE

(71) Applicant: SunSun Electronic Technology Inc., Boulder, CO (US)

(72) Inventor: Chaocheng Qiu, Boulder, CO (US)

( * ) Notice: Subject to any disclaimer, the term of this patent is extended or adjusted under 35 U.S.C. 154(b) by 275 days.

(21) Appl. No.: 16/844,107

(22) Filed: Apr. 9, 2020

(65) Prior Publication Data
US 2021/0190581 A1    Jun. 24, 2021

(51) Int. Cl.
*A01K 15/02* (2006.01)
*G01H 11/02* (2006.01)
*A01K 27/00* (2006.01)

(52) U.S. Cl.
CPC ........... *G01H 11/02* (2013.01); *A01K 15/022* (2013.01); *A01K 27/001* (2013.01)

(58) Field of Classification Search
CPC .... A01K 15/022; A01K 15/021; A01K 15/02; A01K 15/00; A01K 27/001; G01H 11/02
See application file for complete search history.

(56) References Cited

U.S. PATENT DOCUMENTS

| | | | |
|---|---|---|---|
| 6,170,439 B1 * | 1/2001 | Duncan ................ | A01K 15/021 119/908 |
| 10,588,295 B1 * | 3/2020 | Riley .................... | A01K 15/021 |
| 2021/0400393 A1 * | 12/2021 | Wang ....................... | H04R 9/10 |

FOREIGN PATENT DOCUMENTS

CN           110864710 A    *    3/2020    ........... A01K 15/022

* cited by examiner

*Primary Examiner* — Kristen C Hayes
(74) *Attorney, Agent, or Firm* — Rumit Ranjit Kanakia

(57) ABSTRACT

The invention discloses a bark detection method. An induction coil located in a magnetic field is arranged in a bark stop device worn on a head and neck part of a pet dog, and is configured to monitor a violent vibration action of a throat part of the pet dog. Violent vibration of the throat part of the pet dog during barking causes relative displacement between the magnetic field and the induction coil, so that the induction coil cuts magnetic lines of force of the magnetic field and generates an induction current. The induction current is collected and compared to judge whether the pet dog is barking or not. By using the induction current generated by the induction coil as a basis for judging whether the pet dog is barking or not, judging accuracy can be improved, and erroneous judgment is reduced to a great degree. The invention also discloses a bark detection device and a bark stop device with the device.

10 Claims, 3 Drawing Sheets

BARK DETECTION METHOD, BARK DETECTION DEVICE AND BARK STOP DEVICE WITH DEVICE

TECHNICAL FIELD

The invention relates to pet electronic supplies, in particular to a bark detection method, a bark detection device and a bark stop device with the device.

BACKGROUND

There are more and more pet dogs in cities. The pet dogs easily bark when being stimulated by external sounds, thus influencing others. In order to prevent frequent barking or tool long barking time of the pet dogs, bark stop devices are designed by people. When the pet dog loudly barks, the bark stop device stimulates the pet dog so that the pet dog stops barking.

The existing bark stop devices are mostly bar stop devices based on audio judgment. The existing bark stop device has an annular buckle belt, a high-voltage generating device, a detection device and the like. The annular buckle belt is sleeved over a neck of a pet, and the high-voltage generating device and the detection device are arranged thereon. The high-voltage generating device has a contact probe. If the detection device detects the pet barking, the high-voltage generating device works to generate high voltage to stimulate the pet through the probe, and the pet is warned and does not dare to bark.

However, a control device of the bark stop device is relatively simple. Electric shock may be generally triggered by relatively loud sounds, such as door closing sounds, sounds of horns, bark sounds of other pet dogs and the like, so that it can cause harm on the pet dogs, and the pet dogs are at loose ends and have trouble forming good habits.

SUMMARY

The invention is directed to provide a bark detection method.

The invention is also directed to provide a bark detection device.

The invention is further directed to provide a bark stop device with the bark detection device.

According to one aspect of the invention, a bark detection method is provided. An induction coil located in a magnetic field is arranged in a bark stop device worn on a head and neck part of a pet dog, and is configured to monitor a violent vibration action of a throat part of the pet dog. Violent vibration of the throat part of the pet dog during barking causes relative displacement between the magnetic field and the induction coil, so that the induction coil cuts magnetic lines of force of the magnetic field and generates an induction current. The induction current is collected and compared to judge whether the pet dog is barking or not.

By using the induction current generated by the induction coil as a basis for judging whether the pet dog is barking or not, judging accuracy can be improved, and erroneous judgment is reduced to a great degree.

Specifically, the magnetic field is provided by a magnet arranged near the induction coil, and the induction coil is located in a range of the magnetic field generated by the magnet.

Specifically, the magnet is mounted on an elastic device. The throat vibration of the pet dog enables the magnet on the elastic device to elastically vibrate, so that a changing magnetic field is generated, and the induction coil generates the induction current.

Further, the induction current is collected, compared and judged by a microprocessor arranged in the bark stop device.

According to another aspect of the invention, a bark detection device is provided. The bark detection device includes at least one magnet and an inductor located in a range of a magnetic field of the magnet. The magnet is mounted on an elastic device. The elastic device drives the magnet to elastically vibrate when a throat part of a pet dog vibrates, so that an induction coil of the inductor generates an induction current.

Preferably, an arrangement direction of the elastic device is not coincident with a moving track of the throat part of the pet dog during violent vibration.

Further, the arrangement direction of the elastic device is vertical to the moving track of the throat part of the pet dog during the violent vibration. Therefore, the vibration of the throat part of the pet dog during barking may cause the elastic device to drive the magnet to swing at a great amplitude, so that a relatively high induction current is favorably generated for easy detection.

Specifically, the elastic device is a spring or an elastic sheet.

According to another aspect of the invention, a bark stop device with the bark detection device is provided. The bark stop device includes a casing and a main control circuit board arranged inside the casing. The casing is fixed to the throat part of the pet dog through a collar. The main control circuit board is connected with a storage battery. The storage battery is configured to provide a working current. The inductor is arranged on the main control circuit board. The main control circuit board is provided with a frequency comparison unit configured to collect and compare the induction current generated by the inductor. The main control circuit board uses a comparison result of the frequency comparison unit as a judging basis of giving out a bark stop instruction.

A vibration motor and/or an ultrasonic wave generator are/is also arranged inside the casing. The vibration motor or the ultrasonic wave generator is respectively connected with the main control circuit board and receives the bark stop instruction of the main control circuit board. The main control circuit board controls the vibration motor to generate vibration, or controls the ultrasonic wave generator to emit ultrasonic waves so as to warn the pet dog, so that the pet dog stops barking.

In some embodiments, an electric shock electrode is arranged outside the casing, and is next to skin of the pet dog. The electric shock electrode is connected with the main control circuit board and receives the bark stop instruction of the main control circuit board. The main control circuit board controls the electric shock electrode to generate electric shock so as to discipline the pet dog, so that the pet dog stops barking.

The bark stop device with the bark detection device provided by the invention uses an electromagnetic induction principle. Whether the pet dog is barking or not can be judged by collecting and comparing the induction current. Then, the pet dog is warned or disciplined through the vibration or the electric shock, so that the pet dog stops barking. Therefore, an erroneous judgment probability of the bark stop device can be greatly reduced. A dog training effect can be better exerted. The pet dog can favorably form good habits.

DETAILED DESCRIPTION

The invention is further illustrated in detail hereafter with reference to figures.

Embodiment 1

Figure 1:
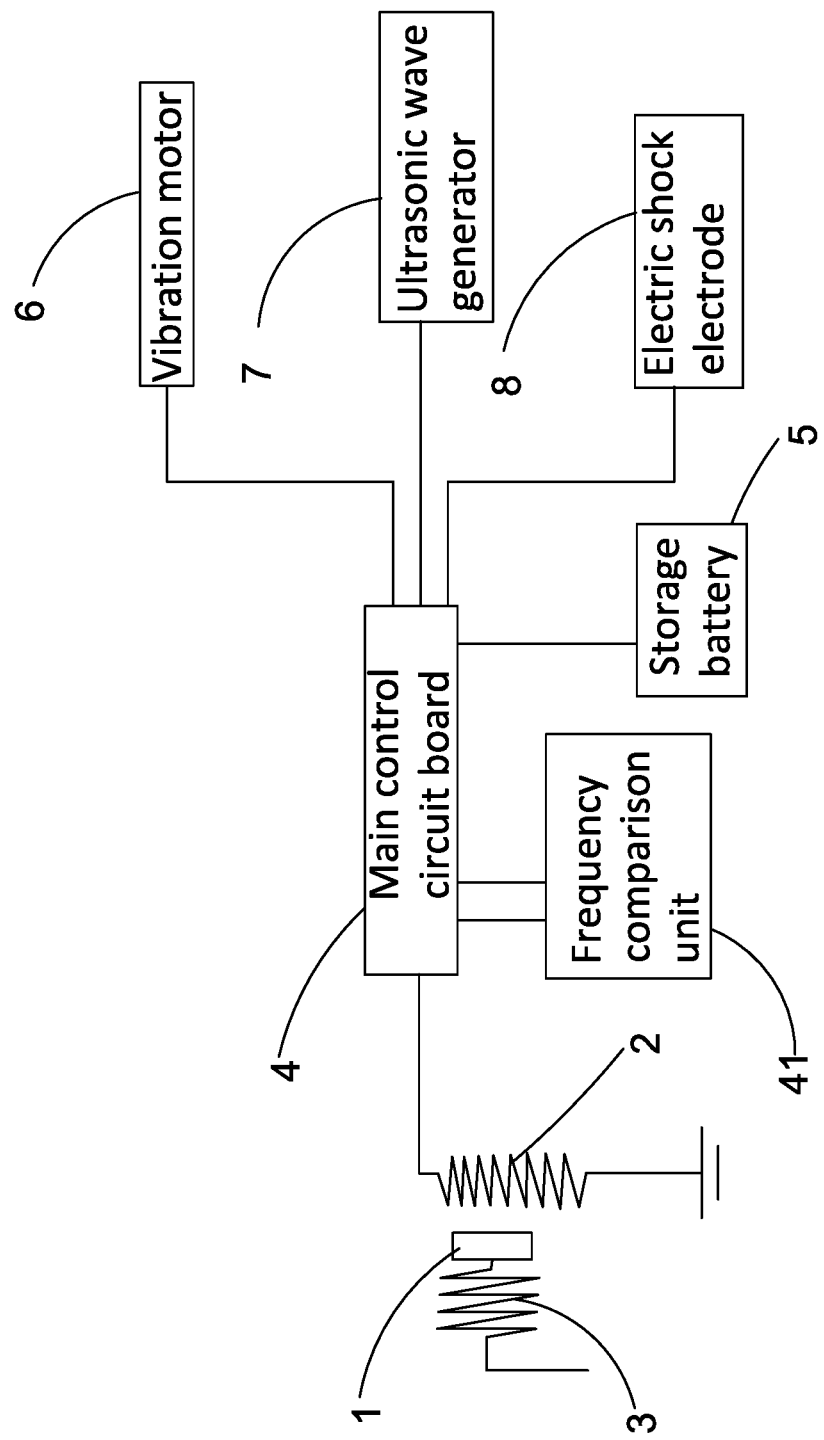
FIG. 1 is a schematic circuit diagram of a bark stop device with a bark detection device according to one embodiment of the invention.

FIG. 1 schematically shows a bark stop device with a bark detection device according to one embodiment of the invention.

As shown in the figure, the device includes a casing (not shown in the figure) and a main control circuit board 4 arranged inside the casing.

The technical scheme is invented on the basis of an inside structure of the casing, and is practically irrelevant to a form and a specification of the casing. The casing of the bark stop device in a general sense can meet requirements of the technical scheme, so that a shape of the casing is not specifically described herein.

The casing of the bark stop device is generally fixed to a throat part of a pet dog through a collar.

The main control circuit board 4 is connected with a storage battery 5.

The storage battery 5 is configured to provide a working current.

The bark detection device is arranged on the main control circuit board 4.

Figure 2:
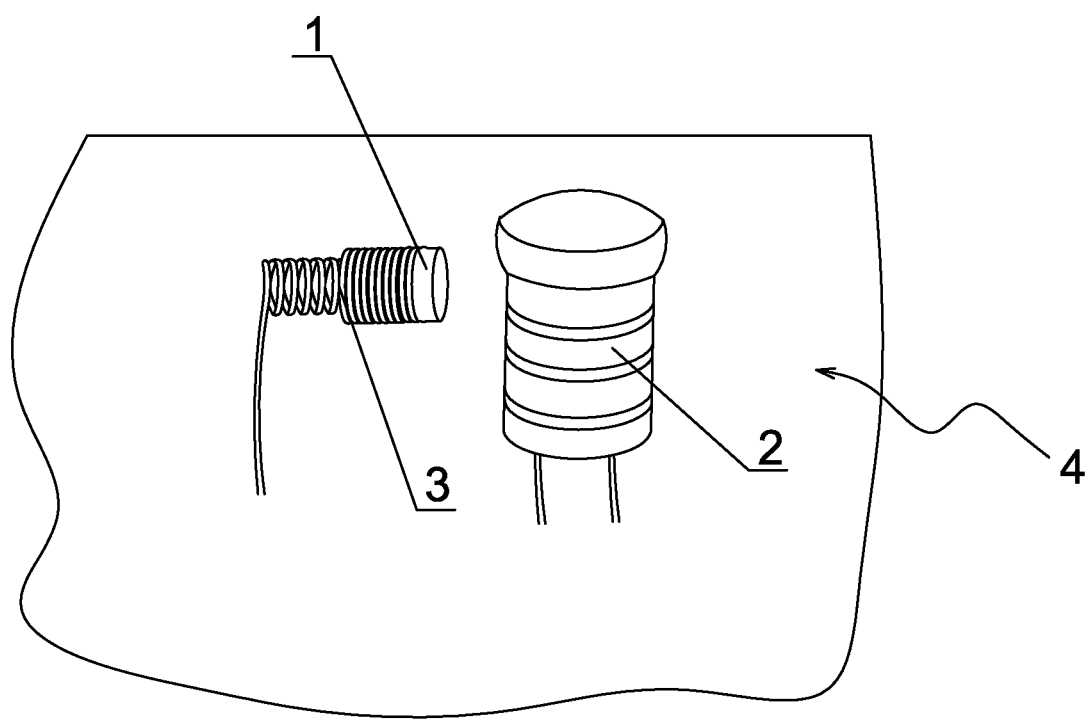
FIG. 2 is a schematic structure diagram of the bark detection device shown in FIG. 1.

As shown in FIG. 2, the bark detection device includes a magnet 1 and an inductor 2 located in a range of a magnetic field of the magnet 1.

The magnet 1 is mounted on a spring 3. The spring 3 drives the magnet 1 to elastically vibrate when a throat part of a pet dog vibrates, so that an induction coil of the inductor 2 generates an induction current.

Preferably, an arrangement direction of the spring 3 is not coincident with a moving track of the throat part of the pet dog during violent vibration.

In the present embodiment, the arrangement direction of the spring 3 is vertical to the moving track of the throat part of the pet dog during the violent vibration. Therefore, the vibration of the throat part of the pet dog during barking may cause the spring 3 to drive the magnet 1 to swing at a great amplitude, so that a relatively high induction current is favorably generated for easy detection.

In other embodiments, an elastic device may also be an elastic sheet.

In the present embodiment, the main control circuit board 4 is provided with a frequency comparison unit 41 configured to collect and compare the induction current generated by the inductor 2. The main control circuit board 4 uses a comparison result of the frequency comparison unit 41 as a judging basis of giving out a bark stop instruction.

A vibration motor 6 and an ultrasonic wave generator 7 are also arranged inside the casing. The vibration motor 6 or the ultrasonic wave generator 7 is respectively connected with the main control circuit board 4 and receives the bark stop instruction of the main control circuit board 4. The main control circuit board 4 controls the vibration motor 6 to generate vibration, or controls the ultrasonic wave generator 7 to emit ultrasonic waves so as to warn the pet dog, so that the pet dog stops barking.

In the present embodiment, an electric shock electrode 8 is also arranged outside the casing. The electric shock electrode 8 is next to skin of the pet dog.

The electric shock electrode 8 is connected with the main control circuit board 4 and receives the bark stop instruction of the main control circuit board 4. The main control circuit board 4 controls the electric shock electrode 8 to generate electric shock so as to discipline the pet dog, so that the pet dog stops barking.

A bark detection method of the bark stop device with the bark detection device in the present embodiment is specifically as follows:

the induction coil located in the magnetic field is arranged in the bark stop device worn on a head and neck part of the pet dog, and is configured to monitor a violent vibration action of the throat part of the pet dog, the violent vibration of the throat part of the pet dog during barking causes relative displacement between the magnetic field and the induction coil, so that the induction coil cuts magnetic lines of force of the magnetic field and generates the induction current, and the induction current is collected and compared to judge whether the pet dog is barking or not.

Figure 3:
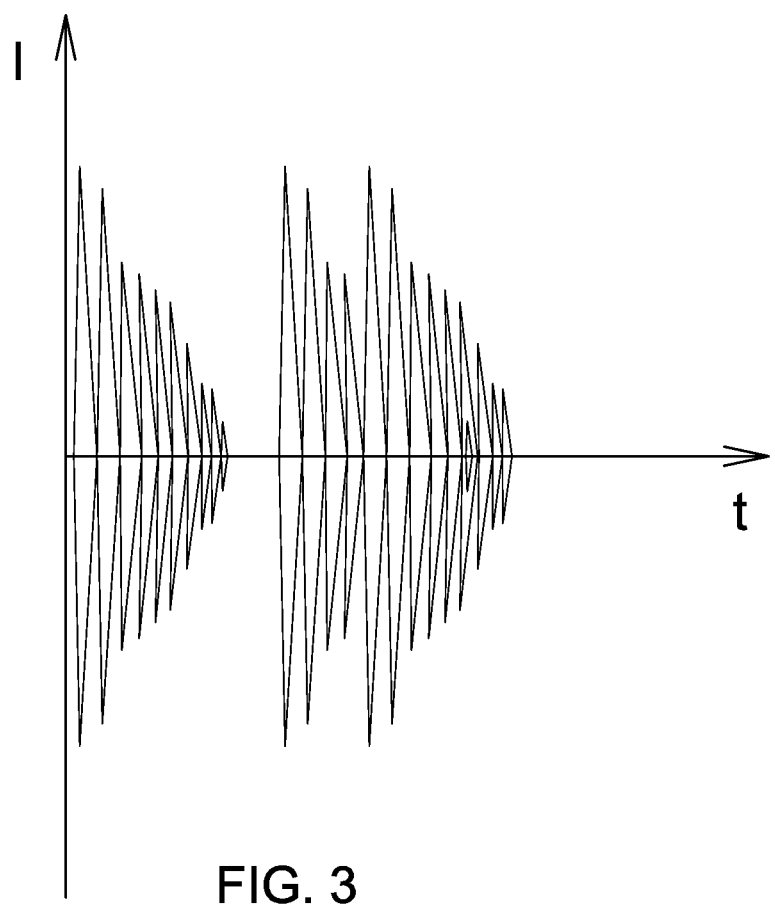
FIG. 3 is a schematic diagram of an induction current generated by the bark detection device shown in FIG. 2 during pet dog barking.

When the pet dog is barking in a form of "Woof! Woof, woof!", a form of the induction current is shown in FIG. 3.

It can be seen from the figure that when the pet dog barks, the induction current generated by the bark detection device is generated in a special form, so that identifiability is relatively strong, and the induction current can be conveniently judged and recognized by a microprocessor.

By using the induction current generated by the induction coil as a basis for judging whether the pet dog is barking or not, judging accuracy can be improved, and erroneous judgment is reduced to a great degree.

In the present embodiment, the magnetic field is provided by the magnet 1 arranged near the induction coil, and the induction coil is located in the range of the magnetic field generated by the magnet 1.

The magnet 1 is mounted on the spring 3. The vibration of the throat part of the pet dog enables the magnet 1 on the spring 3 to elastically vibrate, so that a changing magnetic field is generated, and the induction coil generates the induction current.

The induction current is collected, compared and judged by the microprocessor arranged in the bark stop device.

The bark stop device with the bark detection device provided by the invention uses an electromagnetic induction principle. Whether the pet dog is barking or not can be judged by collecting and comparing the induction current. Then, the pet dog is warned or disciplined through the vibration or the electric shock. Therefore, an erroneous judgment probability of the bark stop device can be greatly reduced. A dog training effect can be better achieved. The pet dog can favorably form good habits.

Embodiment 2

Figure 4:
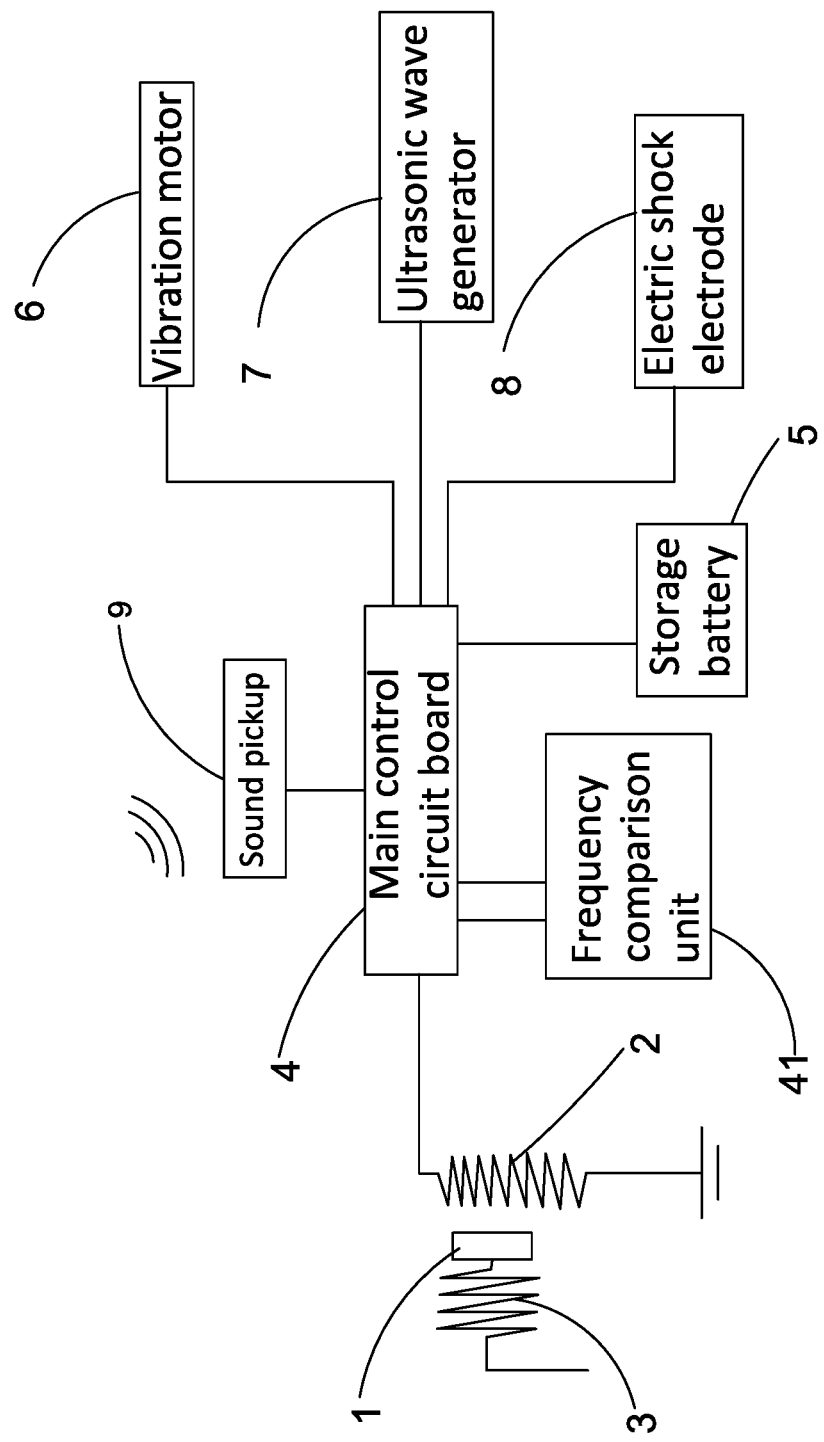
FIG. 4 is a schematic circuit diagram of a bark stop device with a bark detection device according to another embodiment of the invention.

FIG. 4 schematically shows a bark stop device with a bark detection device according to another embodiment of the invention. As shown in the figure, a difference from the Embodiment 1 is that a sound pickup 9 used in an existing bark stop device is also arranged in a main control circuit board 4 and is configured to pick sound intensity and frequency during pet dog barking. In the present embodiment, the sound pickup 9 is used as a means combined with the bark detection device to identify pet dog barking. The main control circuit 4 gives out a bark stop instruction when and only when the sound pickup 9 and the bark detection device simultaneously give a judgment that the pet dog is barking. Therefore, secondary verification by dual means can be performed, external interference is further eliminated, and the judging accuracy is improved.

The descriptions above are just some embodiments of the invention. For those skilled in the art, a number of variations and improvements can also be made without departing from the spirit of the invention, and those all fall within the scope of protection of the invention.

What is claimed is:

1. A bark detection method, wherein an induction coil located in a magnetic field is arranged in a bark stop device worn on a head and neck part of a pet dog, and is configured to monitor a vibration action of a throat part of the pet dog, vibration of the throat part of the pet dog during barking causes relative displacement between the magnetic field and the induction coil, so that the induction coil cuts magnetic lines of force of the magnetic field and generates an induction current, and the induction current is collected and compared to judge whether the pet dog is barking or not.

2. The bark detection method according to claim 1, wherein the magnetic field is provided by a magnet arranged near the induction coil, and the induction coil is located in a range of the magnetic field generated by the magnet.

3. The bark detection method according to claim 2, wherein the magnet is mounted on an elastic device, and the throat vibration of the pet dog enables the magnet on the elastic device to elastically vibrate, so that a changing magnetic field is generated, and the induction coil generates the induction current.

4. The bark detection method according to claim 1, wherein the induction current is collected, compared and judged by a microprocessor arranged in the bark stop device.

5. A bark detection device, wherein the bark detection device comprises at least one magnet and an inductor located in a range of a magnetic field of the magnet; the magnet is mounted on an elastic device; and the elastic device drives the magnet to elastically vibrate when a throat part of a pet dog vibrates, so that an induction coil of the inductor generates an induction current.

6. The bark detection device according to claim 5, wherein an arrangement direction of the elastic device is not coincident with a moving track of the throat part of the pet dog during vibration.

7. The bark detection device according to claim 6, wherein the arrangement direction of the elastic device is vertical to the moving track of the throat part of the pet dog during the vibration.

8. The bark detection device according to any one of claim 7, wherein the elastic device is a spring or an elastic sheet.

9. A bark stop device with the bark detection device according to claim 7, wherein the bark stop device comprises a casing and a main control circuit board arranged inside the casing; the casing is fixed to the throat part of the pet dog through a collar; the main control circuit board is connected with a storage battery; the storage battery is configured to provide a working current; the inductor is arranged on the main control circuit board; the main control circuit board is provided with a frequency comparison unit configured to collect and compare the induction current generated by the inductor; the main control circuit board uses a comparison result of the frequency comparison unit as a judging basis of giving out a bark stop instruction;

a vibration motor and/or an ultrasonic wave generator are/is also arranged inside the casing; the vibration motor or the ultrasonic wave generator is respectively connected with the main control circuit board and receives the bark stop instruction of the main control circuit board; and the main control circuit board controls the vibration motor to generate vibration, or controls the ultrasonic wave generator to emit ultrasonic waves so as to warn the pet dog.

10. The bark stop device with the bark detection device according to claim 9, wherein an electric shock electrode is also arranged outside the casing, and is next to skin of the pet dog; the electric shock electrode is connected with the main control circuit board and receives the bark stop instruction of the main control circuit board; and the main control circuit board controls the electric shock electrode to generate electric shock so as to discipline the pet dog.

* * * * *